United States Patent [19]

Iwamoto

[11] Patent Number: 5,171,516
[45] Date of Patent: Dec. 15, 1992

[54] REACTOR CORE MONITORING SYSTEM AND METHOD

[75] Inventor: Tatsuya Iwamoto, Kanagawa, Japan

[73] Assignee: Kabushiki Kaisha Toshiba, Kawasaki, Japan

[21] Appl. No.: 770,921

[22] Filed: Oct. 4, 1991

[30] Foreign Application Priority Data

Oct. 4, 1990 [JP] Japan .................................. 2-265222

[51] Int. Cl.⁵ ............................................. G21C 17/00
[52] U.S. Cl. .................................................. 376/216
[58] Field of Search ............... 376/216, 215, 217, 255, 376/254

[56] References Cited

U.S. PATENT DOCUMENTS 4,367,196  1/1983  Wende et al. .......................... 376/237
5,091,139  2/1992  Chao et al. ............................ 376/216

FOREIGN PATENT DOCUMENTS 62-106396  5/1987  Japan .

OTHER PUBLICATIONS

M. Tsuiki, et al. "Verification of Advanced Methods in TARMS Boiling Water Reactor Core Management System", Sep. 1990, pp. 1-10.
R. T. Lahey, Jr., et al. "The Thermal-Hydraulics of a Boiling Water Nuclear Reactor", 1977, pp. 112-123, 166-169, and ix-xi.

*Primary Examiner*—Daniel D. Wasil
*Attorney, Agent, or Firm*—Oblon, Spivak, McClelland, Maier & Neustadt

[57] ABSTRACT

A reactor core monitoring system and method wherein: by solving the heterogenous neutron diffusion equation in an infinite lattice consisting only of the fuel segment under consideration of the fuel segments arranged in a reactor core, the local power distribution in infinite lattice and the R factor in infinite lattice used in the critical quality calculation are found beforehand, the neutron diffusion equation is solved by homogenizing each of the fuel segments in a region defined in the core and consisting of the selected fuel segment and the fuel segments surrounding the selected fuel segment. Using this solution, the local power distributions are found by correcting the previously found local power distribution in an infinite lattice consisting only of the selected fuel segment. The R factor for the selected fuel segment is then corrected, and the critical power ratio is determined using this corrected R factor. Control rods of the reactor core are inserted to avoid a boiling transition when the critical power ratio falls below a predetermined threshold.

15 Claims, 9 Drawing Sheets

| I | III | II | I |
|---|---|---|---|
| III | II | I | III |
| II | I | III | II |
| I | III | II | I |

*Fig. 7.*

| A13 | A14 | A15 | A16 |
|---|---|---|---|
| A9 | A10 | A11 | A12 |
| A5 | A6 | A7 | A8 |
| A1 | A2 | A3 | A4 |

AN EXAMPLE OF A CALCULATED CRITICAL POWER RATIO FOR A REPRESENTATIVE BWR CORE (1/4 CORE SHOWN); OPERATING LIMITING cpr (THRESHOLD) IS 1.20

| J/I | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1  |      |      |      |      |      |      |      |      | 5.11 | 4.39 | 3.97 | 3.76 | 3.63 | 3.57 | 3.57 |
| 2  |      |      |      |      |      |      |      | 4.02 | 3.07 | 2.61 | 2.50 | 2.40 | 2.28 | 2.29 | 2.25 |
| 3  |      |      |      |      |      | 5.05 | 3.67 | 2.58 | 2.17 | 2.04 | 1.86 | 1.70 | 1.83 | 1.75 | 1.54 |
| 4  |      |      |      |      |      | 3.64 | 2.53 | 2.04 | 1.81 | 1.66 | 1.50 | 1.93 | 1.50 | 1.43 | 1.88 |
| 5  |      |      |      |      | 3.70 | 2.58 | 2.11 | 1.87 | 1.61 | 1.44 | 1.80 | 1.37 | 1.32 | 1.76 | 1.37 |
| 6  |      |      | 5.05 | 3.64 | 2.58 | 2.12 | 1.88 | 1.68 | 1.45 | 1.79 | 1.31 | 1.28 | 1.69 | 1.28 | 1.48 |
| 7  |      |      | 3.67 | 2.53 | 2.11 | 1.88 | 2.23 | 2.07 | 1.40 | 1.36 | 1.25 | 1.65 | 1.27 | 1.40 | 1.88 |
| 8  |      | 4.02 | 2.58 | 2.04 | 1.87 | 1.68 | 2.07 | 1.99 | 1.47 | 1.29 | 1.65 | 1.23 | 1.30 | 1.37 | 1.79 |
| 9  | 5.11 | 3.04 | 2.17 | 1.81 | 1.61 | 1.45 | 1.40 | 1.42 | 1.20 | 1.68 | 1.27 | 1.30 | 1.70 | 1.27 | 1.25 |
| 10 | 4.39 | 2.61 | 2.04 | 1.66 | 1.44 | 1.79 | 1.36 | 1.29 | 1.63 | 1.26 | 1.42 | 1.40 | 1.29 | 1.26 | 1.48 |
| 11 | 3.97 | 2.50 | 1.86 | 1.50 | 1.80 | 1.31 | 1.25 | 1.65 | 1.24 | 1.42 | 1.90 | 1.91 | 1.42 | 1.25 | 1.47 |
| 12 | 3.76 | 2.40 | 1.70 | 1.93 | 1.37 | 1.28 | 1.65 | 1.23 | 1.39 | 1.40 | 1.91 | 1.93 | 1.41 | 1.24 | 1.49 |
| 13 | 3.63 | 2.28 | 1.83 | 1.50 | 1.32 | 1.69 | 1.27 | 1.30 | 1.70 | 1.29 | 1.42 | 1.41 | 1.22 | 1.56 | 1.28 |
| 14 | 3.57 | 2.29 | 1.75 | 1.43 | 1.76 | 1.28 | 1.40 | 1.37 | 1.24 | 1.26 | 1.25 | 1.24 | 1.56 | 1.56 | 1.39 |
| 15 | 3.52 | 2.21 | 1.57 | 1.81 | 1.38 | 1.43 | 1.81 | 1.79 | 1.25 | 1.47 | 1.44 | 1.44 | 1.23 | 1.32 | 1.94 |

*Fig. 11.*

REACTOR CORE MONITORING SYSTEM AND METHOD

BACKGROUND OF THE INVENTION

1. Field of the Invention

This invention relates to a reactor core monitoring system and method, and especially to a monitoring system which monitors the critical power ratio of each of the fuel segments in an atomic reactor.

2. Background of the Invention

In order to ensure the health of the fuel during operation of an atomic reactor, burn-out of the fuel rods must be prevented. This is done by preventing a shift from a nucleate boiling condition to a boiling transition condition caused by heating, from the fuel rods, of the cooling water used to cool the fuel assembly. The critical power ratio (CPR) is employed as an index of boiling transition.

$$CPR = critical\ power\ (CP)/channel\ power \qquad \ldots (1)$$

where the critical power CP is defined as the power of the fuel assembly that generates boiling transition.

The critical quality Xc is used as the index of critical power at this point. The critical quality Xc is calculated using the boiling transition correlation expression. In the case of a boiling water reactor, the following GEXL expression given for example in "The thermal-hydraulics of a boiling water nuclear reactor", by R. T. Lahey, Jr. and F. J. Moody, published by American Nuclear Society, second printing, 1979, is usually employed.

$$Xc = f(LB,\ Da,\ G,\ L,\ Pr,\ R) \qquad \ldots (2)$$

where
- LB = boiling length
- Da = thermal equivalent diameter
- G = coolant mass flux
- L = heat length
- Pr = pressure
- R = a factor characterizing the local power distribution within the fuel assembly.

The R-factor is included in this correlation expression (1) for the critical quality Xc. This R factor is defined as a function of the local power distribution p, and is defined for each individual fuel rod.

Here, the local output power is the power density of each fuel rod when the average power of all the fuel rods of the fuel assembly is normalized to 1.0. That is, the R factor of the fuel assembly is given as a function of the most limiting fuel rod power density or the power density of the peripheral fuel rods.

$$R = R(p) \ldots \qquad (3)$$

In monitoring the power distribution or predicting the power distribution of the core, the power of the assembly is usually calculated by the following method. Specifically, in general the fuel assembly constituting the core is divided into a large number of fuel segments in the axial direction, and the approximation is made that the fuel composition is homogeneous within these fuel segments. The few-group neutron diffusion equation or modified-one-group neutron diffusion equation is then solved, to calculate the average neutron flux taking a fuel segment as a unit and the thermal power density for each of the fuel segments. This is a homogeneous neutron diffusion calculation taking into account the movement of neutrons between the respective fuel segments, and taking into account the effects of fuel type, void fraction, and exposure, etc., of neighboring fuel segments. However, within each segment, the neutron flux and thermal power density are calculated on the assumption that these are homogeneous. Consequently, the local power distribution or R factor within a fuel segment, which depends on the heterogeneity of composition within the fuel segment, cannot be found.

The distribution of neutron flux and thermal power density for each of the fuel segments which are thus obtained express the global power distribution of the core as a whole. They are therefore termed the global power distributions.

In general, the local power distribution within a fuel segment depends on a characteristic index of the fuel segment determined by the fuel type, for example the geometrical shape of the fuel segment itself, the density and degree of enrichment of the charged fuel, the distribution, etc., of burnable poisons such as gadolinia, the void fraction of the fuel segment itself, and exposure. It also depends on the fuel type, void fraction, and exposure of fuel segments near to the fuel segment under consideration, and on the pattern of insertion of neighboring control rods. This is because during operation neutrons move between fuel segments in the core.

Consequently, although a homogeneous neutron diffusion calculation based on the approximation that the composition of the material within the fuel segments is homogeneous does take into account the effect of neighboring fuel segments, it cannot be used to find the local power distribution or R factor within a fuel segment.

Consideration has therefore been given to calculating the local power distribution within a fuel segment by a heterogeneous neutron diffusion calculation taking into account the movement of neutrons between fuel segments in the core. However, this is not practical as it requires a lot of computational cost and time.

The local power distribution and R factor within a fuel segment were therefore found by a heterogeneous neutron diffusion calculation in an infinite lattice consisting only of the fuel segment in question. An "infinite lattice" is a single fuel segment system to which a mirror symmetry boundary condition is applied at the boundaries in all directions of the fuel segment in question. This heterogeneous neutron diffusion calculation in an infinite lattice was usually carried out at the design stage of the fuel assembly.

In this heterogeneous neutron diffusion calculation in an infinite lattice, the local power distribution taking into account heterogeneity within the fuel segment in obtained, but the effect of neighboring fuel segments is not considered.

However, with fuel improvements made in recent years with the object of raising core performance, it has become common for different types of fuel to be arranged adjacent to each other in the core. This has increased the effect on the local power distribution. This has led to the problem in monitoring the core that since, in finding the R factor by a heterogeneous neutron diffusion calculation in an infinite lattice, the effects of fuel type, void fraction, and exposure of neighboring fuel segments on the above-mentioned local power distribution and the effect of neighboring control rods are neglected, monitoring of the reactor is more difficult due to a lowering of the accuracy of determining the local power distribution. The R factor must be taken into consideration.

SUMMARY OF THE INVENTION

An object of the invention is to provide a reactor core monitoring system and method which monitor the critical power ratio (CPR) of a fuel assembly, and can obtain the CPR accurately and within an appropriate calculating time, taking into account the effects of neighboring fuel segments.

Another object of the invention is to provide a reactor core monitoring system and method which produces a representation of the status of the reactor core.

A further object of the invention is to provide a reactor core monitoring system and method which monitor the CPR and inserts control rods into the reactor core when the CPR falls below a predetermined threshold value, thereby avoiding a boiling transition.

These and other objects are achieved by a reactor core monitoring system having a reactor core with a plurality of fuel cells, each fuel cell being comprised of a plurality of fuel rods, and monitoring and controlling means for monitoring core state parameters of the reactor core and controlling the operation of the reactor core. Using the core state parameters, a reactor core performance means determines a global power distribution of the reactor core which is used by a core neutron diffusion means which determines a deviation of the thermal neutron flux at a fuel rod position in a selected fuel segment and the thermal neutron flux in infinite lattice for the selected fuel segment on the basis of nuclear constants stored in the memory means and the global power distribution.

The system further includes a memory means for storing nuclear constants in infinite lattice, a local power distribution in infinite lattice, and a R factor in infinite lattice attained beforehand by a heterogeneous neutron flux diffusion calculation in infinite lattice. A local power distribution determining means determines a local power distribution in the selected fuel segment on the basis of the thermal neutron flux deviation determined by the core neutron diffusion determining means and the local power distribution in infinite lattice stored in the memory means. A R factor correction means determines a corrected R factor based on the R factor in infinite lattice stored in the memory means and the local power distribution in the selected fuel segment determined by the local power distribution determining means. A critical power ratio determining means determines a critical power ratio on the basis of the corrected R factor.

The system may also include a reactor status indicator which provides a status of the reactor core on the basis of the determined critical power ratio. The status indicator may comprise a display screen which displays the calculated critical power ratios allowing constant and immediate visual inspection of the operation status of the reactor core.

The monitoring and controlling means may include means for inserting a control rod into the reactor core when the critical power ratio falls below a predetermined threshold, thereby avoiding a boiling transition.

The above objects are also achieved by a reactor core monitoring method for monitoring a reactor core having a plurality of fuel assemblies each having a plurality of fuel segments, each fuel segment having a plurality of fuel rods, including storing beforehand nuclear constants in infinite lattice, a local power distribution in infinite lattice and a R factor in infinite lattice obtained by calculating a heterogeneous neutron flux diffusion in infinite lattice. The method also includes monitoring core state parameters of the reactor core and determining a global power distribution on the basis of the core state parameters from the reactor core. A deviation of the thermal neutron flux at a fuel rod position in a selected fuel segment and the thermal neutron flux in infinite lattice for the selected fuel segment is determined based on the stored nuclear constants and the global power distribution. The local power distribution in the selected fuel segment is determined based upon the thermal neutron flux deviation and the stored local power distribution and infinite lattice. Next, a corrected R factor is determined based upon the stored R factor and infinite lattice and the local power distribution in the selected fuel segment. A critical power ratio is determined from the corrected R factor, and the method controls positions of the control rods of the reactor core when the critical power ratio falls below a predetermined threshold.

The method according to the present invention may also include producing a representation of the status of the reactor core, and determining the corrected R factor directly from the local power distribution or based upon the R factor in infinite lattice stored beforehand and on the local power of the selected fuel rod.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
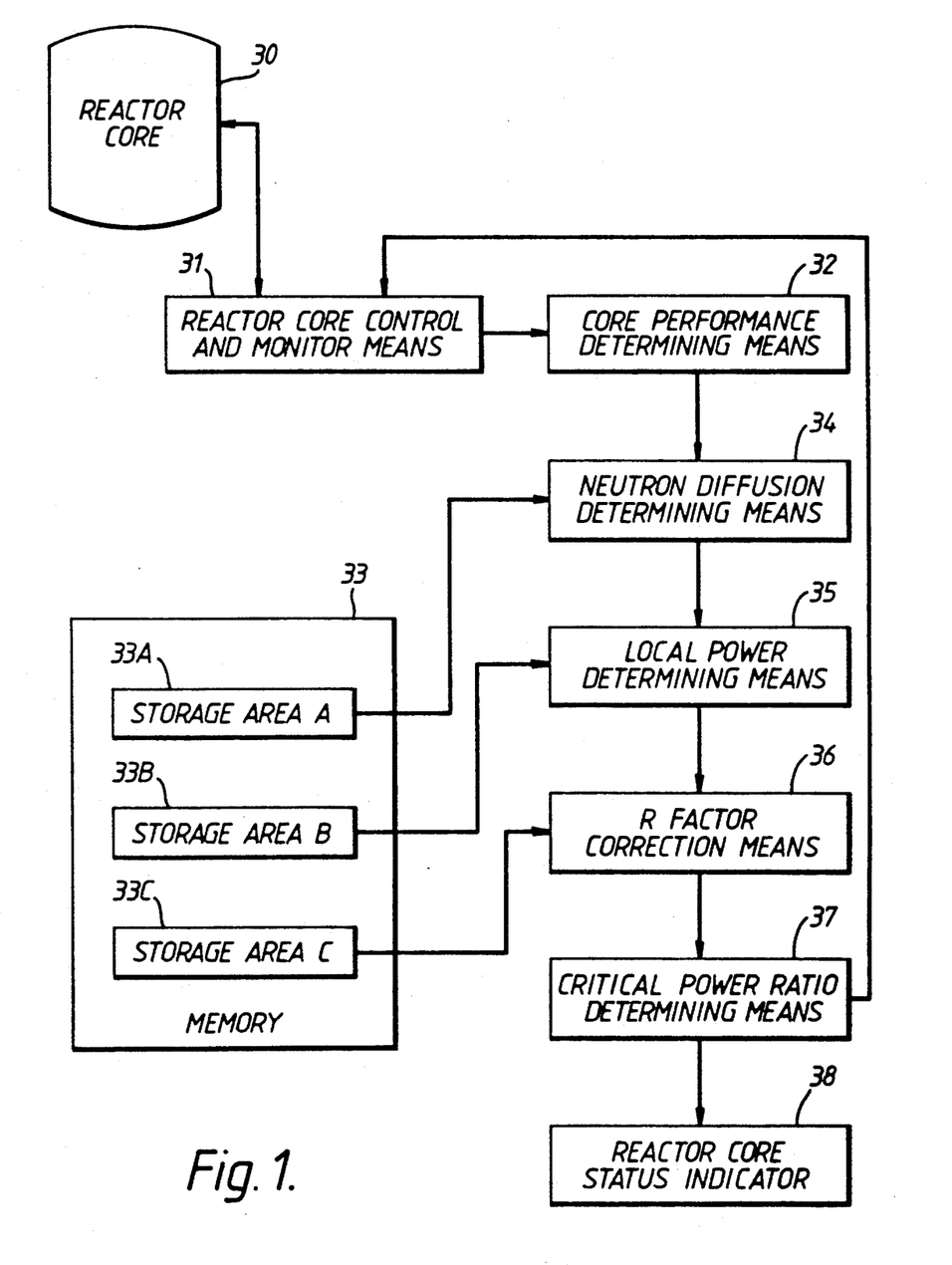
FIG. 1 is a block diagram showing an embodiment of a reactor core monitoring system according to the invention.
Figure 2:
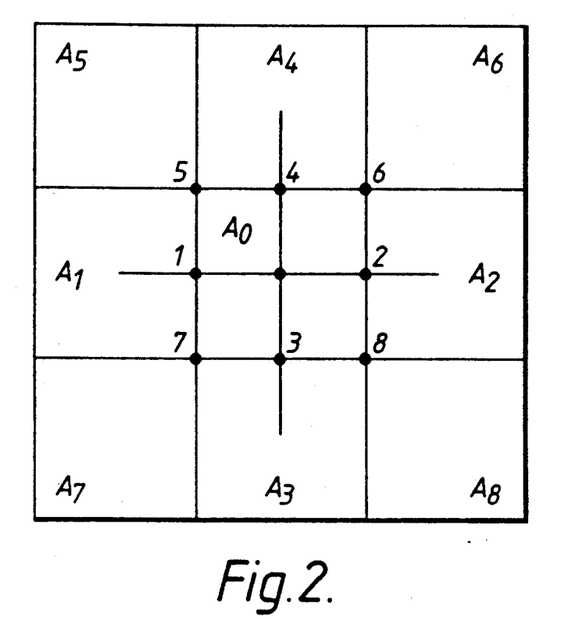
FIG. 2 is a diagram showing a fuel segment and adjacent fuel segments.

Referring now to the drawings, wherein like reference numerals designate identical or corresponding parts throughout the several views, and more particularly to FIG. 1 thereof, the reactor core monitoring system according to the invention is shown which includes core 30 made up of a plurality of fuel cells, each fuel cell containing a plurality of fuel rods. FIG. 2 shows nine adjacent fuel segments $A_O$–$A_g$. The monitoring system also includes a monitoring and control means 31 which controls the operation of the reactor core 30 and monitors core state parameters such as the core flux and positions of the control rods, etc., of the reactor core 30.

Monitor and control means 31 also includes a controller, which may include a microprocessor, and apparatus for moving the control rods 25 to required positions in the core. A detailed description of the controller and moving apparatus is omitted for brevity as they are believed to be well understood by those skilled in the art.

Figure 3:
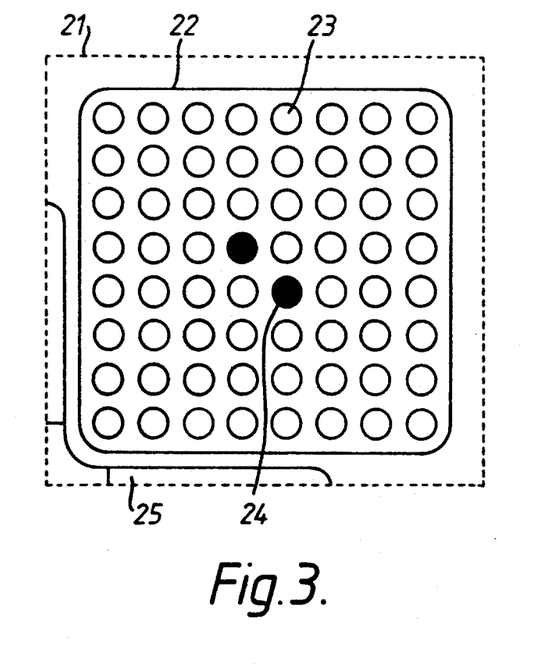
FIG. 3 is a diagram of a fuel segment.

In FIG. 3, a fuel segment 21 is shown having fuel rods 23 made of boiling water reactor fuel and arranged in 8 rows and 8 columns in a channel box 22 which is provided with two water rods 24 at its center. A control rod 25 is located at one corner of fuel segment $A_O$.

A typical fuel assembly (not shown) is made up of a number of fuel segments, for example 24, arranged one on top of the other. A fuel assembly is typically 5-6 meters long. The reactor contains a plurality of the fuel assemblies, for example 64, as will be understood by one skilled in the art.

Figure 4:
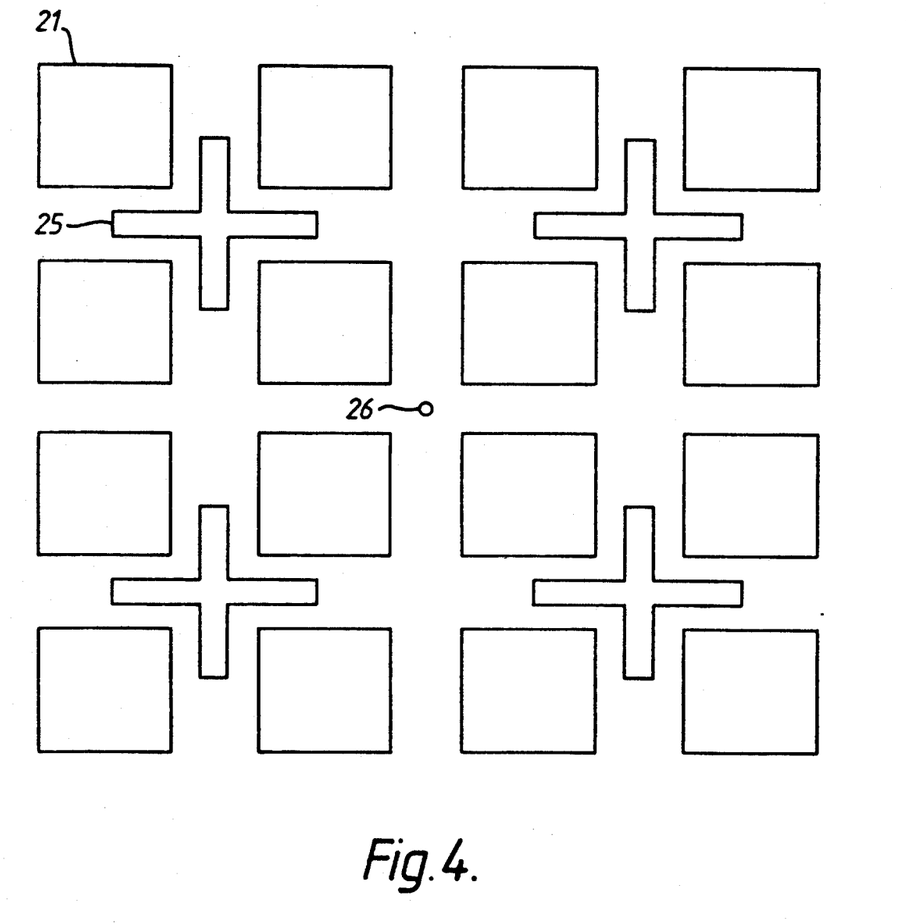
FIG. 4 is a diagram of a section of the reactor core.

FIG. 4 illustrates a section of the reactor 30 with a plurality of fuel segments 21, each group of four having a control rod 25 disposed at a central position of the group, as is conventional in the art. Also shown in FIG. 4 is monitor 26, which is typically in the form of a rod. Monitor 26 provides information of the operation of the reactor core 30 to monitoring means 31. It is be understood that FIG. 4 is provided for illustration purposes only, and the dimensions and positions of the fuel segments 21, control rods 25, and monitor 26 do not necessarily reflect the actual dimensions positions, and arrangement in a reactor core.

A memory device 33 stores the nuclear constants in an infinite lattice, the local power distribution in an infinite lattice, and the R factor in an infinite lattice, etc., which were previously found by solving the heterogeneous neutron diffusion equation in an infinite lattice consisting only of the fuel segment in question, of the fuel segments arranged in the core 30 of the atomic reactor. This heterogeneous neutron diffusion equation in an infinite lattice is that typically used in the design calculations of a fuel assembly.

Several memory devices are capable of storing the various required data, as will be apparent to one skilled in the art. In this embodiment, a single memory such as a read-only memory is used, but a separate memory may be used for each of the nuclear constants, local power distribution and R factor.

The nuclear constants in the infinite lattice are stored in nuclear constant storage area 33A of memory device 33. The local power distribution in the infinite lattice is stored in local power distribution storage area 33B of memory device 33. The R factor in the infinite lattice is stored in R factor storage area 33C of memory device 33.

The nuclear constants in infinite lattice stored in nuclear constant storage area 33A include the average spectral index F of a fuel segment in infinite lattice, the average macroscopic removal area S of thermal neutrons in a fuel segment, and the average diffusion coefficient D in a fuel segment.

The local power distribution obtained by solving the heterogeneous neutron diffusion equation of a fuel segment in infinite lattice and the R factor for critical quality calculated from this are stored in storage areas 33B and 33C, respectively, as functions of the void fraction and exposure in tabular form or by fitting. In some cases, the local power distribution in infinite lattice which is stored in storage area 33B may be the local power of all the fuel rods in each of the fuel segments. Usually, however, the position, exposure, and void fraction points, etc., of several representative fuel rods or large local power in infinite lattice found by the fuel assembly design calculation are stored and the largest values of these are taken as the thermally most limiting local power of fuel rods of each of the fuel segments.

The various parameters from reactor core monitoring means 31 are input to a core performance determining means 32 which determines the global power distribution of the core 30. The global power distribution, and consequently the channel power distribution, in a BWR core are determined by solving coupled nuclear thermal-hydraulics equations. Next, a core neutron diffusion determining means 34 determines the difference of thermal neutron flux between the thermal neutron flux at the position of a fuel rod and the thermal neutron flux in infinite lattice in a fuel segment under consideration, of the various fuel segments in reactor core 30. This core neutron from nuclear constant storage area 33A and the global power distribution from core performance determining means 32

Of all the fuel segments whose global power distribution obtained by core performance determining means 32 is indicated, a particular fuel segment is selected for consideration. The diffusion equation for thermal neutron flux of a system wherein each of the fuel segments is homogenized is then solved in a two-dimensional region defined in the core and constituted of the fuel segment under consideration and the neighboring fuel segments surrounding it. This diffusion equation is expressed by the following equation (4) by a two-group neutron diffusion model, where the first group is the fast group and the second group is the thermal group.

$$-\nabla^2\Psi + K^2\Psi = K^2 F\Phi \qquad \ldots (4)$$

where
 $\Psi$ is the thermal neutron flux
 $\nabla^2$ is the Laplace operator, and $$K^2 = S/D; \qquad \ldots (5)$$

and where
 F is the average spectral index of the fuel segment in infinite lattice,
 $\Phi$ is the average fast neutron flux of the fuel segment,
 S is the average macroscopic removal area, and
 D is the average diffusion coefficient of the fuel segment for thermal neutrons.

The spectral index F is defined as the ratio of the thermal neutron flux to the fast neutron flux. In equations (4) and (5), the composition in a fuel segment is assumed to be homogeneous. For the nuclear constants, the fuel segment average values obtained by the design calculation of the fuel assembly in infinite lattice are used. Also, the fast neutron flux $\Phi$ is assumed to be spatially flat within a fuel segment. $F\Phi$ on the right-hand side in equation (4) expresses the thermal neutron flux when there is no gradient of the thermal neutrons, i.e., in the case of a homogenized infinite lattice. This is provisionally called the asymptotic thermal neutron flux.

Diffusion equation (4) is a partial differential equation and can usually be solved numerically by a finite difference method. An example of such a method is given in: L. A. Hageman; "Numerical Methods and Techniques used in the Two-Dimensional Neutron-Diffusion Program PDQ-5", WAPD-TM-364 (1963). The boundary conditions used are the conditions of outer boundary mirror symmetry of the regions defined within the core and the four-side periodic boundary condition, etc. These boundary conditions do not strictly hold, but, in a narrow region such as is in question, it is justifiable to regard the fast neutron flux as practically uniform and the thermal neutron flux as becoming an asymptotic value at a distance of about ½ of one side of a fuel segment, so the neutron flux distribution can be obtained with sufficient accuracy for this purpose by these boundary conditions.

In order to shorten the calculation time, diffusion equation (4) can be solved analytically under the approximation of fixed boundary conditions. An example of such a method of solution is disclosed in Early Japanese Patent Publication Sho. 62-106396 "Device for Monitoring Local Power Peaking Coefficient". In this method of solution, in ordinary light water reactor fuel, the effect of adjacent fuel segments on the value of the thermal neutron flux decreases with the distance r from the boundary with the adjacent fuel segment practically in the form $\exp(-Kr)$ and becomes a practically negligible magnitude at about ½ of the fuel segment width. Using this to specify an approximate boundary condition, the difference between the thermal neutron flux at fuel rod position (x,y) in a fuel segment and the asymptotic thermal neutron flux $F\Phi$ is given by equation (6).

$$\delta\Psi(x,y) = \sum_{n=1}^{4} \Phi(F_n - F_0)\exp(-Kr_n) \quad (6)$$

where, as shown in FIG. 2, $A_O$ indicates the fuel segment under consideration and $A_1$ to $A_4$ indicate the four fuel segments adjacently facing this fuel segment $A_O$ in the radial direction. Also in equation (6), $$\sum_{n=1}^{4}$$

indicates the sum of the variables $F_n$ and $r_n$ (n=1 to 4) for these fuel segments $A_1$ to $A_4$, and $r_n$ is the length of a perpendicular dropped from a fuel rod at a position (x,y) in fuel segment $A_O$ under consideration onto the boundary line with the adjacent fuel segment $A_n$ (n=1 to 4). $F_0$ is the average spectral index of the fuel segment under consideration, and $F_n$ is the average spectral index of the respective adjacent fuel segments $A_n$ (n=1 to 4).

In equation (6) the effect of the fuel segments $A_5$ to $A_8$ that are diagonally adjacent to the fuel segment in question is neglected, but, if greater accuracy is required, an analytic solution can be obtained by the following equation using boundary conditions taking into account the effects of these fuel segments $A_5$ to $A_8$.

$$\delta\Psi(x,y) = \sum_{n=1}^{4} \Phi\delta F_n \exp(-Kr_n) + \quad (7)$$

$$\sum_{n=5}^{8} \Phi(\delta F_n - \delta F_1 - \delta F_m)\exp(-Kr_1/\sqrt{2})\exp(-Kr_m/\sqrt{2})$$

$$\delta F_n = (K_n F_n + K_0 F_0)/(K_n + K_0) - F_0 \text{ for } n = 4 \quad (8)$$

$$\delta F_n = (K_n F_n + K_1 F_1 + K_m F_m + K_0 F_0)/ \quad (9)$$

$$(K_n + K_1 + K_m + K_0) - F_0 \text{ for } n = 5\text{-}8$$

Here, the subscript m indicates the two respective facing adjacent fuel segments $A_m$ on both sides of fuel segments $A_5$ to $A_8$ that are diagonally adjacent fuel segment $A_O$ under consideration. For example, in the case of fuel segment $A_5$ that is diagonally adjacent fuel segment $A_O$, the two fuel segments $A_1$ and $A_4$ correspond to $A_m$.

$\delta F_n$ (n=1 to 8) indicates the values of the change from the asymptotic spectrum of the spectrum at points (indicated by solid black circles) on the boundary of fuel segment $A_O$ of FIG. 2. Equation (7) is one type of approximate analytical solution of equation (4), and has the following desirable features.

(1) At the center of the fuel segment the thermal neutron flux approaches the asymptotic value. That is, $\delta\Psi$ approaches O.

(2) At the mid-point of the side of the fuel segment and at the apex, equation (7) satisfies the asymptotic boundary values given by equations (8) and (9).

(3) On the line linking the centers of the two fuel segments that are facing and adjacent each other (indicated by a broken line in FIG. 2), the thermal neutron flux approaches the solution of the one-dimensional diffusion equation on this line.

It has been confirmed by numerical experiment that the deviation $\delta\Psi(x,y)$ of the thermal neutron flux at a fuel rod position (x,y) in a fuel segment and the asymptotic thermal neutron flux $F\Phi$ shows good agreement with the change of the thermal neutron flux distribution from infinite lattice obtained by heterogeneous calculation.

Thus the neutron flux deviation $\delta\Psi(x,y)$ determined by core neutron diffusion determining means 34 is input to a local power distribution determining means 35 that finds the local power distribution within the fuel segment in question.

Local power distribution determining means 35 determines the local power distribution within fuel segment $A_O$ in question, using the neutron flux deviation $\delta\Psi(x,y)$ and local power distribution $P_\infty(x,y)$ in infinite lattice stored in local power distribution storage area 33B.

The local power distribution $P_\infty$ in infinite lattice is indicated by the following equation.

$$P_\infty(x,y) = S_{f1}\Phi_\infty + S_{f2}\Psi_\infty \quad \ldots (10)$$

where p is normalized such that its average is 1.0. The subscript $\infty$ indicates the value in infinite lattice. $S_{f1}$ indicates the first group fission cross-section and $S_{f2}$ indicates the second group fission cross-section.

The local power distribution in a system that is subject to the effects of adjacent fuel segments is indicated by the following equation:

$$[P_{2g}(x,y)+P(x,y)]/(1+\delta P_{av}) \quad \ldots (11)$$

where $\delta P(x,y)$ = the change in local power distribution and
$\delta P_{av}$ = the average change in local power distribution.

Since practically all the contributions to the power distribution are produced by the thermal group, from equation (10):

$$\delta P(x,y) = S_f \delta \Psi(x,y) = [P_{2s}(x,y)/\Psi_{2s}(x,y)] \quad \ldots (12)$$

If this is substituted in equation (11) and second-order terms in δ are neglected, $$\begin{aligned} P(x,y) &= P_\infty(x,y)(1 - \delta P_{av}) + [P_\infty(x,y)/\Psi_\infty]\delta\Psi(x,y) \\ &= P_\infty(x,y) + P_\infty(x,y)[\delta\Psi(x,y)/\Psi_\infty - \delta P_{av}]. \end{aligned} \quad (13)$$

where $P_{av} = \sum_{i=1}^{n} P(X_i, Y_i)/n.$

Thus, within the two-dimensional region defined within the core and constituted by fuel segment $A_O$ under consideration and the neighboring fuel segments surrounding it, the local power distribution taking into account the effect of adjacent fuel segments is obtained using the thermal neutron flux deviation $\delta\Psi(x,y)$ and local power distribution $P_{28}(x,y)$ in infinite lattice found by a neutron diffusion calculation in a system obtained by homogenizing these respective fuel segments.

The local power distribution within the fuel segment $A_O$ under consideration obtained by local power distribution determining means 35 is input to an R factor correction means 36. R factor correction means 36 finds a corrected R factor from the R factor in infinite lattice and the local power distribution in segment $A_O$ under consideration obtained by local power distribution determining means 35.

When the local power in infinite lattice for all the fuel rods of fuel sequent $A_O$ under consideration have been stored in local power distribution storage area 33B in infinite lattice, calculation is made, using equation (2), directly from the local power distribution obtained by local power distribution determining means 35. In contrast, if only the local power in infinite lattice of the several most thermally limiting fuel rods in fuel segment $A_O$ is stored, the solution is found approximately using the following equation, using the value $R_O$ of the R factor in infinite lattice that is stored in R factor storage area 33C and the change of local power of the most thermally limiting fuel rods.

$$R = R_O + A(\partial R/\partial P_{max})\delta P_{max} \quad \ldots (14)$$

$P_{max}$ is the local power of the fuel rod that is most thermally limiting. The maximum local power peak of fuel segment $A_O$ can also be substituted for $P_{max}$. The maximum local power peak is given as the maximum value of the corrected values determined by local power distribution determining means 35, of the local power in infinite lattice of the several most thermally limiting fuel rods that are stored. Also, the coefficient A in equation (14) is a correction coefficient that depends on the position of generation of $P_{max}$ in the assembly.

The thus-obtained corrected R factor is input to a critical power ratio determining means 37. Critical power ratio determining means 37 determines the critical power ratio based on the corrected R factor obtained from R factor correction means 36.

Figure 5:
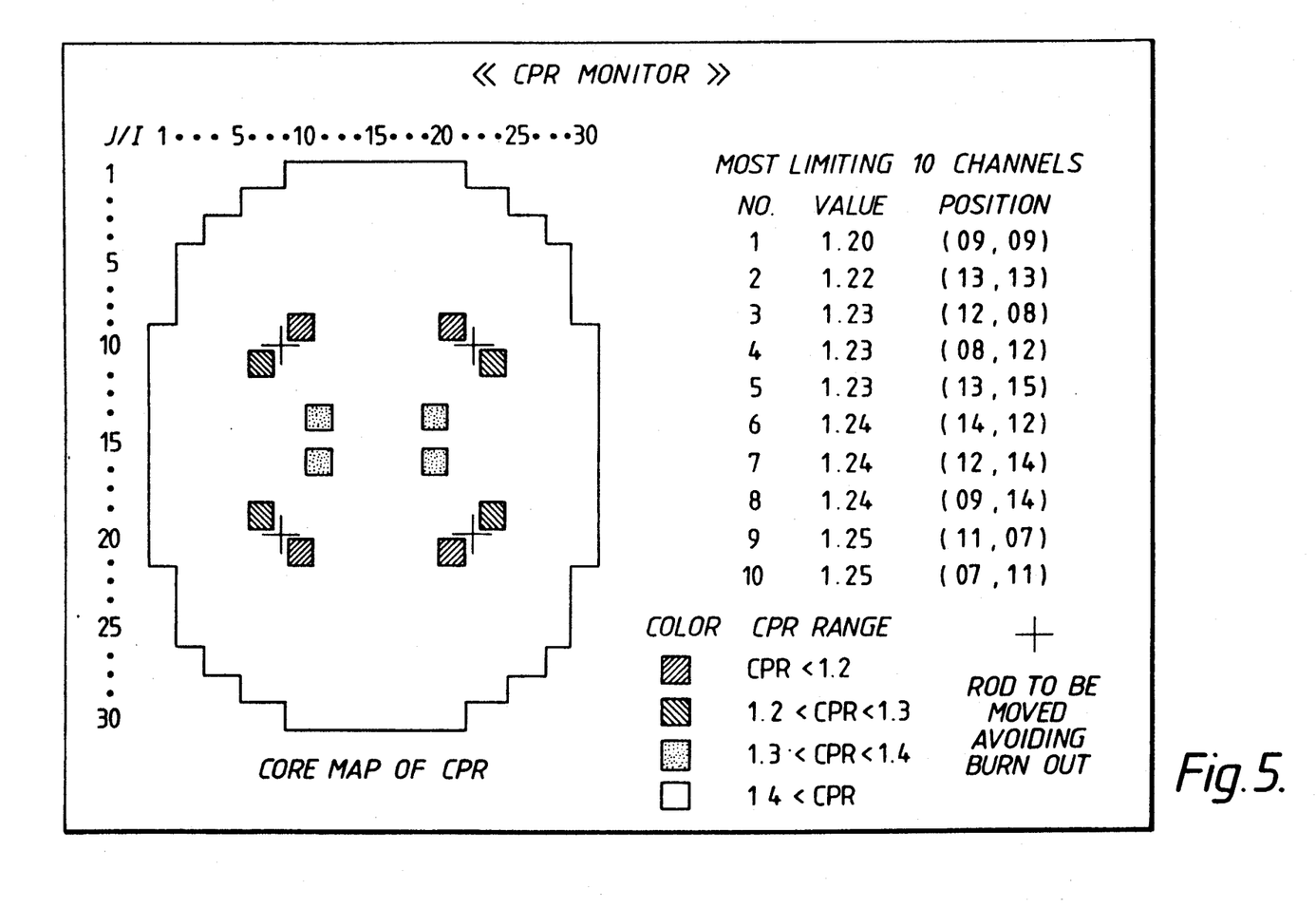
FIG. 5 is a diagram of a display of the status indicator according to the invention.

The critical power ratio is output to a reactor core status indicator 38 which produces a representation of the status of each of the fuel segments 21 of the reactor core 30. FIG. 5 shows a display of the reactor core status indicator according to the invention in which the various fuel segments may be represented by a group of pixels, and various critical power ratios can be assigned a corresponding color. The display includes a core map of the reactor core on the left hand portion where the channels, i.e. the fuel assemblies are displayed according to the calculated CPR value. In the lower right corner, ranges of CPR are assigned a particular color (shown by shading in FIG. 5). The ten most limiting channels are listed in the upper right portion of the screen along with their corresponding positions in the core map. In the case where the CPR has fallen below a particular range, control rods (shown by a cross symbol) have been inserted to avoid possible burn-out of the fuel rods.

Thus, the status of the reactor core can be instantly and continuously provided to an operator, thereby giving warning of any undesirable conditions of any danger of burn-out of the fuel rods.

As shown in FIG. 1, the critical power ratio determining means 37 provides data which is fed back to reactor core monitor and control means 31. In the event that the determined CPR falls below a predetermined value, the power of the reactor core must be reduced to avoid a boiling transition. Upon receipt of a signal indicating that the CPR has fallen below a predetermined threshold, the reactor core monitor and control means 31 then carries out insertion of control rods 25 to reduce the power and thereby avoid a boiling transition. The controller of the monitor and control means 31 activates the moving apparatus to position the appropriate control rods 25 at the required positions.

Figure 6:
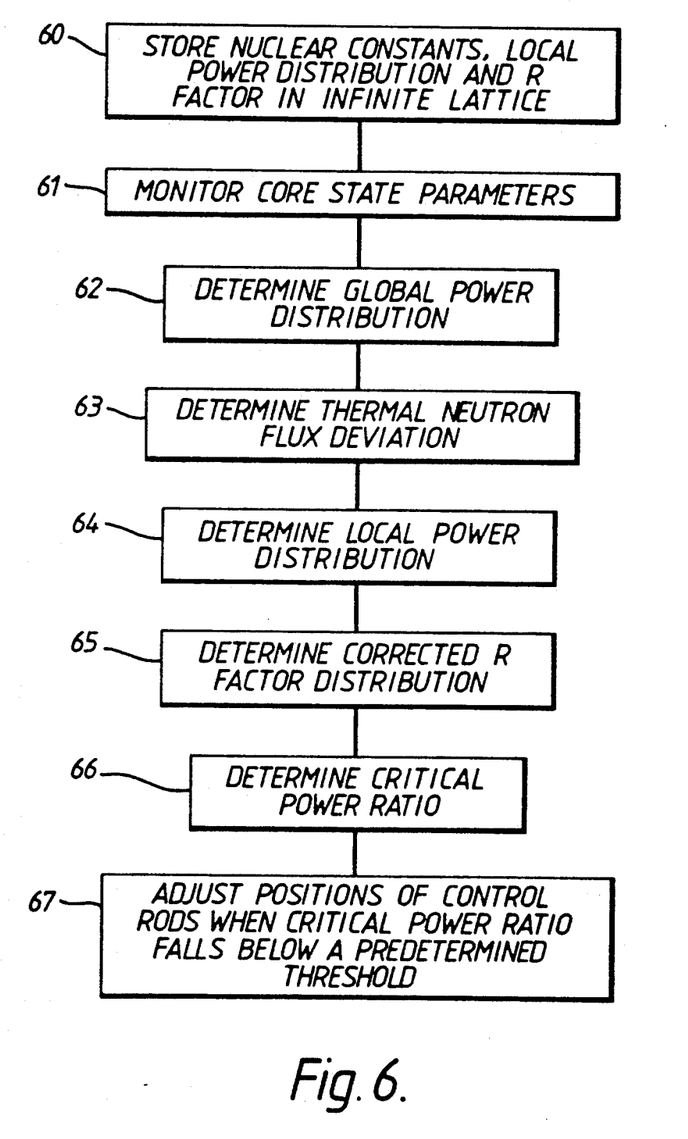
FIG. 6 is a flow diagram of the method according to the invention.

The reactor core monitoring method according to the invention will be described in relation to FIG. 6. In step 60, nuclear constants in infinite lattice, a local power distribution in infinite lattice and R factor in infinite lattice are stored. In step 61, the core state parameters of the reactor core are monitored which are used to determine a global power distribution (step 62). Using the global power distribution and the stored nuclear constants, a deviation between the thermal neutron flux in a fuel rod position in the selected fuel segment and a thermal neutron flux in infinite lattice for the selected fuel segment is determined in step 63. In step 64, a local power distribution of the selected fuel segment is determined based on the thermal neutron flux deviation and the stored local power distribution in infinite lattice. A corrected R factor is determined in step 65 based on the stored R factor in infinite lattice and the local power distribution in the selected fuel segment. In step 66, the CPR is determined based upon the corrected R factor. It is determined in step 67 whether the CPR falls below a predetermined threshold. If the CPR falls below the threshold, the positions of the control rods of the reactor core are adjusted to the appropriate positions to avoid a boiling transition (step 67).

Next, as an example, the R factors found by the invention will be compared with the R factors found by a monitoring apparatus which uses an infinite lattice and a monitoring apparatus which finds R factors using a two-dimensional diffusion calculation in four fuel segments.

Figure 7:
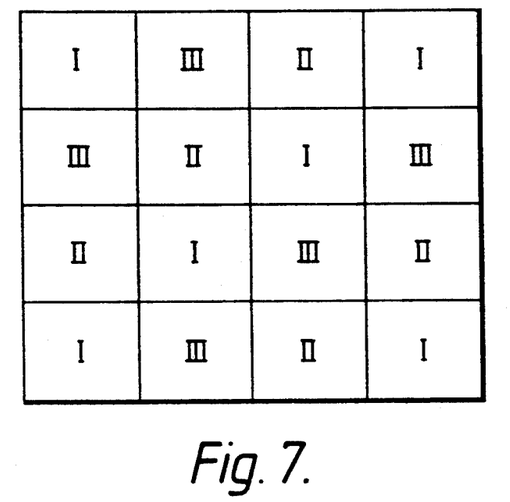
FIG. 7 is a diagram of a fuel segment system used in a two-dimensional detailed diffusion calculation in four segments.

FIG. 7 shows a fuel segment arrangement used in two-dimensional calculation in four fuel segments. The fuel segments are numbered $A_1, A_2, \ldots A_{16}$, beginning from the bottom leftmost segment. The four fuel segments which will now be considered are fuel segments $A_6, A_7, A_{10}$ and $A_{11}$ disposed in the middle region. The other fuel segments constitute a boundary layer.

Figure 8:
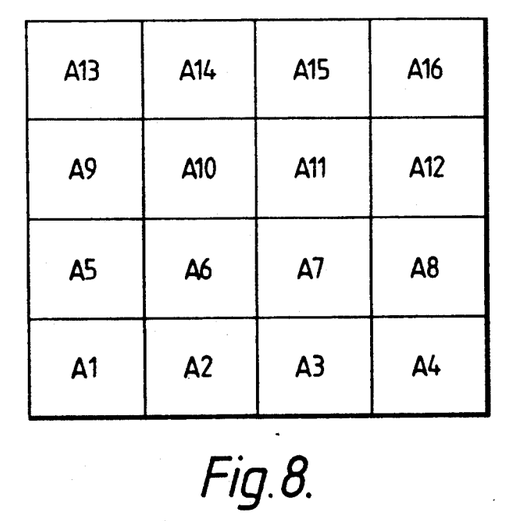
FIG. 8 is a diagram of the arrangement of fuel types in the fuel segment system shown in FIG. 7.

FIG. 8 shows the arrangement of fuel types of the respective fuel segments in the fuel segment arrangement shown in FIG. 7. It is assumed that fuel type I is a low enriched fuel of average enrichment 1.3 w/o, fuel type II is a medium enriched fuel of average enrichment 2.4 w/o, and fuel type III is a high enriched fuel of average enrichment 3.3 w/o. All the fuel types have a fuel rod enrichment distribution. It will also be assumed that fuel type II and fuel type III include gadolinia-containing fuel rods. It will further be assumed that the control rod is not inserted.

Figure 9:
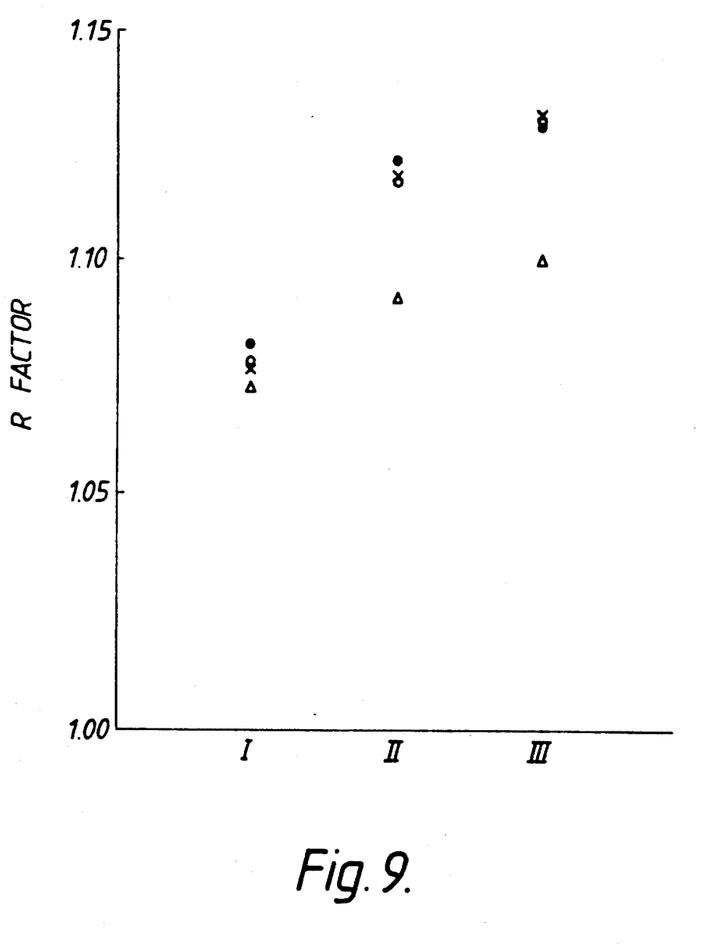
FIG. 9 is a graph showing a comparison of the R factor according to the invention and the conventional R factor when the void fraction of fuel types I, II, and III is 40% in each case.
Figure 10:
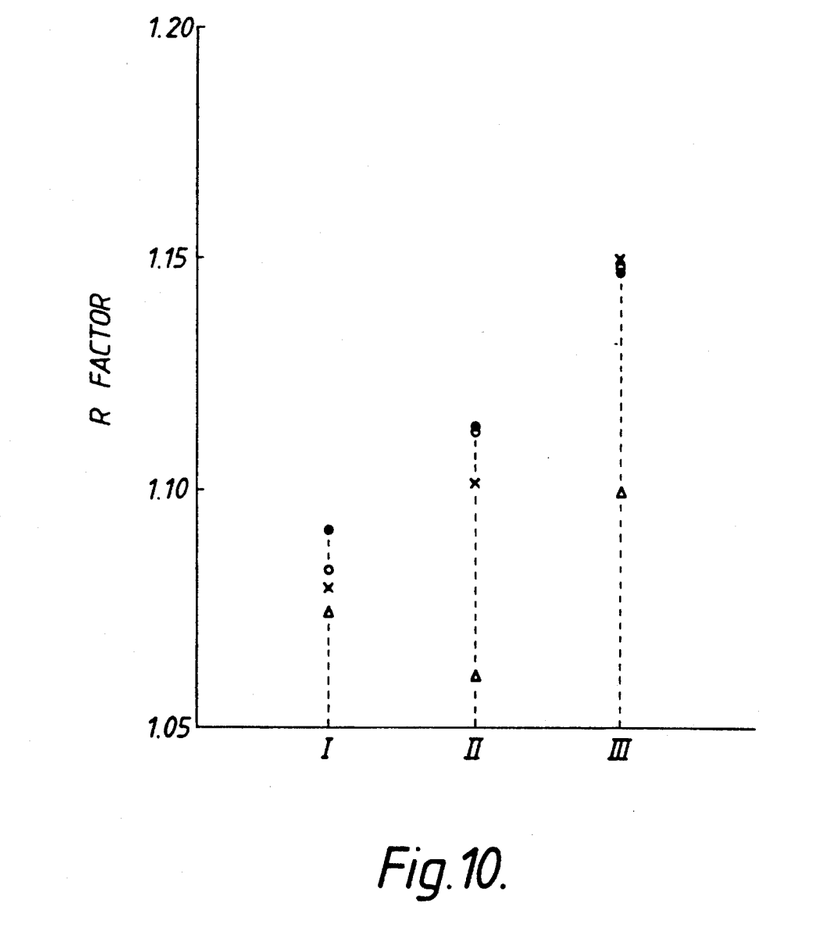
FIG. 10 is a graph showing a comparison of the R factor according to the invention and the conventional R factor when the void fraction of fuel type I is 40% and the void fraction of both fuel types II and III is 70%.

FIG. 9 is a plot showing a comparison of the results of an R-factor determination according to this invention, a two-dimensional diffusion calculation in four fuel segments, and a calculation in infinite lattice, for low enrichment fuel type I, medium enrichment fuel type II, and high enrichment fuel type III. The void fraction is 40% for fuel type I, II, and III. FIG. 10 shows a case where the void fraction of fuel type I is 40%, and the void fraction of fuel types II and III is 70%.

In FIG. 9 and FIG. 10, the calculations in infinite lattice are indicated by a triangle symbol, while the two-dimensional diffusion calculation in four fuel segments is indicated by a solid black circle. The R factor of the system according to this invention in which the local power of all the fuel rods is stored is indicated by an open circle, and that when equation (14) is used, in which only the local power in infinite lattice of the several most thermally limiting fuel rods is stored, is indicated by X, respectively. However, in the local power distribution determination according to the invention, the method of equation (7) is employed, in which the power distribution is found analytically for the sight fuel segments adjacent to the fuel segment under consideration.

Usually, if the R factor is increased by 0.1, the CPR drops by about 0.25 and the thermal margin is decreased. However, from FIG. 9 and FIG. 10, it can be seen that, due to enrichment mismatch, resulting in spectral mismatch, between the fuel segments, the R factor in the medium enrichment fuel and high enrichment fuel is increased by an amount in the range about 0.02–0.05 from the value in infinite lattice. In contrast, in the system according to the invention, in which the local power of all fuel rods is stored, it can be seen that the R factor can be determined with an error of better than 1%, irrespective of fuel type. Also, even in the case of a system wherein only the local power in infinite lattice of the several most thermally limiting fuel rods is stored, notwithstanding that the error is somewhat larger in the case of the medium enrichment fuel, it can be seen that the R factor can be calculated with an average error of better than 1%.

Figure 11:
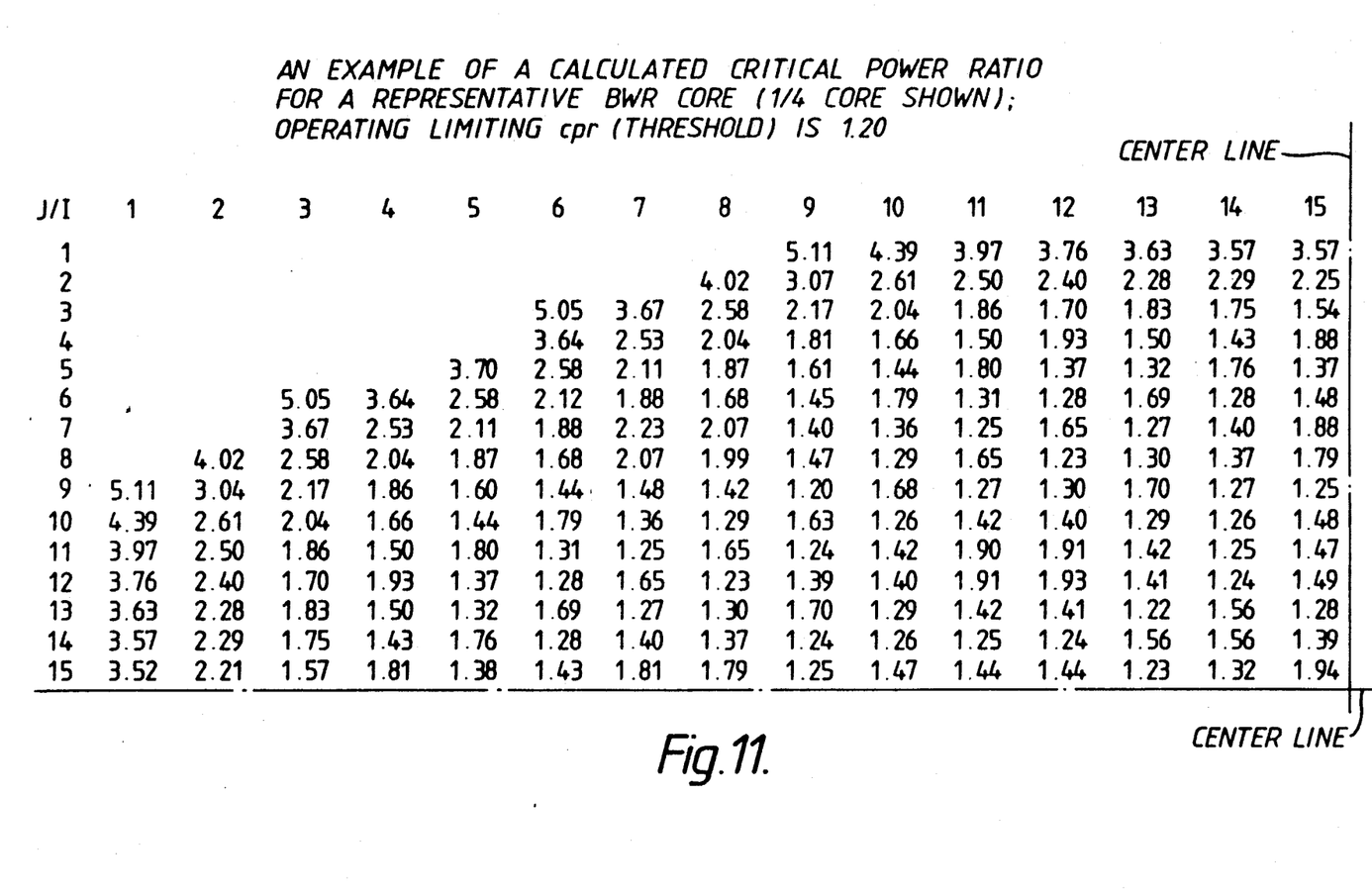
FIG. 11 is a table showing an example of CPR values determined according to the invention.

As an example, calculated CPR for a representative BWR core is shown in FIG. 11. FIG. 11 illustrates one quarter of the BWR core where the operating limiting CPR threshold is 1.20. The fuel assemblies here are shown arranged in 15 columns and 15 rows for a BWR core having fuel assemblies arranged in a matrix having 30 columns and 30 rows (and correspond to the core map which is displayed in FIG. 5).

As described above, with the reactor core monitoring system according to the invention, the benefit is obtained that the critical power can be determined with high accuracy solely from the results of a single fuel segment nuclear calculation, even when there is a large degree of spectral mismatch between fuel segments. Thus, control of the reactor core 30 is enhanced and an undesirable boiling transition can be avoided by inserting control rods 25 when the CPR falls below a predetermined threshold.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A reactor core monitoring system, comprising:
   a reactor core having a plurality of fuel segments, each fuel segment comprising a plurality of fuel rods;
   monitoring and controlling means for monitoring core state parameters of said reactor core and controlling operation of said reactor core;
   memory means for storing nuclear constants in infinite lattice, a local power distribution in infinite lattice, and a R factor in infinite lattice obtained beforehand by a heterogeneous neutron flux diffusion calculation in infinite lattice;
   reactor core performance determining means for determining a global power distribution on the basis of said core state parameters of said reactor core input from said monitoring means;
   core neutron diffusion determining means for determining a deviation of a thermal neutron flux at a fuel rod position in a selected fuel segment and a thermal neutron flux in infinite lattice for said selected fuel segment on the basis of said nuclear constants stored in said memory means and said global power distribution determined by said reactor core performance determining means;
   local power distribution determining means for determining a local power distribution in said selected fuel segment, on the basis of said thermal neutron flux deviation determined by said core neutron diffusion determining means and said local power distribution in infinite lattice stored in said memory means;
   R factor correction means for determining a corrected R factor based on the R factor in infinite lattice stored in said memory means and the local power distribution in said selected fuel segment determined by said local power distribution determining means; and
   critical power ratio determining means for determining a critical power ratio on the basis of the corrected R factor determined by said R factor correction means.

2. A reactor core monitoring system as recited in claim 1, wherein said memory means comprises:
   a first memory for storing said nuclear constants in infinite lattice;
   a second memory for storing said local power distribution in infinite lattice; and
   a third memory for storing said R factor in infinite lattice.

3. A reactor core monitoring system as recited in claim 2, wherein said second memory stores the local power of all of said fuel rods in said selected fuel segment.

4. A reactor core monitoring system as recited in claim 2, wherein said second memory stores the local power of a representative fuel rod of largest local power in the fuel segments.

5. A reactor core monitoring system as recited in claim 3, wherein said R factor correction means determines said corrected R factor directly from the local power distribution obtained by said local power distribution calculating means.

6. A reactor core monitoring system as recited in claim 4, wherein said R factor correction means finds a corrected R factor based on the R factor in infinite lattice stored in said R factor storage area and on the local power of said selected fuel rod.

7. A reactor core monitoring system as recited in claim 1, further comprising:
a reactor core status indicator for providing a status of said reactor core on the basis of said critical power ratio.

8. A reactor core monitoring system as recited in claim 7, wherein said reactor core status indicator includes means for producing a display of said fuel assemblies in said reactor core on the basis of said critical power ratio.

9. A reactor core monitoring system as recited in claim 1, wherein said monitoring and controlling means comprises means for inserting a control rod into said reactor core when said critical power ratio falls below a predetermined threshold, thereby avoiding a boiling transition.

10. A reactor core monitoring method, said reactor core having a plurality of fuel assemblies each having a plurality of fuel segments, and each fuel segment having a plurality of fuel rods, comprising:
storing beforehand nuclear constants in infinite lattice, a local power distribution in infinite lattice and a R factor in infinite lattice obtained by calculating a heterogeneous neutron flux diffusion in infinite lattice;
monitoring core state parameters of said reactor core;
determining a global power distribution on the basis of said core state parameters from said reactor core;
determining a deviation between a thermal neutron flux at a fuel rod position in a selected fuel segment and a thermal neutron flux in infinite lattice for said selected fuel segment based on said stored nuclear constants and said global power distribution;
determining a local power distribution in said selected fuel segment based on said thermal neutron flux deviation and on said stored local power distribution in infinite lattice;
determining a corrected R factor based on said stored R factor in infinite lattice and the local power distribution in said selected fuel segment;
determining a critical power ratio based on the corrected R factor; and
controlling positions of control rods of said reactor core when said critical power ratio falls below a predetermined threshold.

11. A reactor core monitoring method as recited in claim 10, further comprising:
producing a representation of a status of said fuel segments in said reactor core.

12. A reactor core monitoring method as recited in claim 11, wherein said step of producing a representation of a status of said fuel segments in said reactor core includes producing a core map where said fuel segments are displayed based upon said critical power ratio.

13. A reactor core monitoring method as recited in claim 10, wherein said step of determining said corrected R factor comprises determining said R factor directly from said local power distribution.

14. A reactor core monitoring method as recited in claim 10, comprising storing said local power of all of said fuel rods in said selected fuel segment.

15. A reactor core monitoring method as recited in claim 10, comprising storing said local power of a representative fuel rod of largest local power in said fuel segment.

* * * * *